United States Patent
McClain

(10) Patent No.: US 7,058,779 B1
(45) Date of Patent: Jun. 6, 2006

(54) COMPUTER SYSTEM INITIALIZATION VIA BOOT CODE STORED IN A NON-VOLATILE MEMORY HAVING AN INTERFACE COMPATIBLE WITH SYNCHRONOUS DYNAMIC RANDOM ACCESS MEMORY

(75) Inventor: Mark Alan McClain, San Diego, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 608 days.

(21) Appl. No.: 10/091,766

(22) Filed: Mar. 5, 2002

Related U.S. Application Data

(60) Provisional application No. 60/273,616, filed on Mar. 5, 2001.

(51) Int. Cl.
*G06F 12/00* (2006.01)

(52) U.S. Cl. .................. 711/170; 711/100; 711/104; 711/105; 711/111; 711/112; 711/169; 711/170; 713/1; 713/2; 710/10

(58) Field of Classification Search ............... 711/100, 711/104, 105, 111, 170, 112, 169, 213; 713/1, 713/2; 710/10; 712/233
See application file for complete search history.

(56) References Cited

U.S. PATENT DOCUMENTS

| | | | | |
|---|---|---|---|---|
| 5,125,045 | A * | 6/1992 | Murakami et al. | 382/270 |
| 5,509,137 | A * | 4/1996 | Itomitsu et al. | 711/168 |
| 5,951,685 | A * | 9/1999 | Stancil | 713/2 |
| 6,038,648 | A * | 3/2000 | Nakaoka | 711/200 |
| 6,128,731 | A * | 10/2000 | Zarrin et al. | 713/1 |
| 6,226,738 | B1* | 5/2001 | Dowling | 712/225 |
| 6,513,094 | B1* | 1/2003 | Magro | 711/103 |
| 6,601,167 | B1* | 7/2003 | Gibson et al. | 713/2 |
| 6,681,285 | B1* | 1/2004 | Ng | 710/309 |
| 6,708,236 | B1* | 3/2004 | Date et al. | 710/35 |
| 6,748,457 | B1* | 6/2004 | Fallon et al. | 710/2 |
| 6,823,435 | B1* | 11/2004 | Wisor | 711/170 |

* cited by examiner

*Primary Examiner*—Mano Padmanabhan
*Assistant Examiner*—Mardochee Chery

(57) ABSTRACT

A method for reducing the number of interface lines and non-volatile memory devices in a computer system includes providing a non-volatile memory having a SDRAM style interface. A system having both non-volatile memory and SDRAM has reduced interface lines by providing only one memory interface. A system where the SDRAM interface logic is initialized by code stored in the non-volatile memory having a SDRAM style interface, eliminating any requirement for other non-volatile memory, independent of the SDRAM interface, from which to initialize the system.

19 Claims, 2 Drawing Sheets

COMPUTER SYSTEM INITIALIZATION VIA BOOT CODE STORED IN A NON-VOLATILE MEMORY HAVING AN INTERFACE COMPATIBLE WITH SYNCHRONOUS DYNAMIC RANDOM ACCESS MEMORY

This application claims the benefit of U.S. Provisional Application No. 60/273,616, filed Mar. 5, 2001.

FIELD OF THE INVENTION

The invention relates to a computer system and a method of implementing a computer system having a non-volatile memory and a volatile memory. In particular, it relates to a computer system in which the non-volatile memory and volatile memory have a sequential access mode of operation.

BACKGROUND OF THE INVENTION

Computer systems typically include both non-volatile memory, for storing information that has to be retained at power-off, as well as volatile memory.

Dynamic random access memory (DRAM) is a commonly used volatile system memory. It uses an interface with address lines that are typically multiplexed in time. Thus, an address having twice the number of bits as there are address lines is supplied in two successive stages. The most and least significant portions of a complete address are presented sequentially. This arrangement reduces the total number of address lines required. In order to identify which address portion is being sent, each address portion is distinguished by separate control signals. Thus, the DRAM requires control information to access the appropriate memory location.

Synchronous dynamic random access memory (SDRAM) extends this approach by providing a mode in which only the initial address in a sequence of accesses is sent to the memory. Subsequent data locations are read by using additional control signals and a clock signal to indicate when each subsequent data value should be delivered. The SDRAM has internal logic used to advance the data address. In addition to the timing signals, certain control registers of the internal logic of the SDRAM must be loaded with timing control parameters before the sequential access mode may be used.

In addition to the control information needed by the memory itself, the interface logic to the SDRAM also requires initialization. Information is loaded into control registers of the logic subsystem which provides control signals to the SDRAM, to permit access to the SDRAM. Traditionally, this initialization information for the SDRAM memory interface logic and internal logic of the SDRAM memory itself, is provided by instructions read from a separate non-volatile memory in the system.

The disadvantage of these traditional systems is that both the SDRAM and the non-volatile memory in the system have separate interfaces, thus, significantly increasing the number of interface lines and control logic in a system. The present invention seeks to address this problem by creating a non-volatile memory using the same interface as SDRAM thereby providing a system in which both the non-volatile and volatile memories in the system have a common interface. However, using a common: interface, which needs software-controlled initialization, presents a paradox. The instructions for initializing the memory interface logic must be read through the very interface for which the logic has yet to be initialized.

SUMMARY OF THE INVENTION

The present invention seeks to reduce the number of interface lines and non-volatile memory devices in a computer system. The present invention provides for a computer system wherein the non-volatile memory shares a common interface with SDRAM. In particular, the present invention provides for a non-volatile memory that has an SDRAM style memory interface, being used to provide initialization (boot) code to the computer system; eliminating any need for an additional random access non-volatile memory to provide boot code.

SDRAM interface logic has to be initialized before the SDRAM can be accessed. The initializing information is stored in the non-volatile memory, e.g., Flash memory, which creates a dilemma since the non-volatile memory uses an SDRAM interface for which the logic has yet to be initialized. The present invention addresses this problem by making use of the sequential access logic already incorporated in the SDRAM style memory interface, and a limited set of control signals that are independent of the SDRAM interface.

According to the invention there is provided a non-volatile memory having an SDRAM style interface.

Further according to the invention, there is provided a method of initializing a computer system, comprising reading boot code stored in a non-volatile memory, e.g., Flash memory, wherein the memory has an interface compatible with SDRAM, and wherein the first memory location in the non-volatile memory is read using one or more control signals that function independently of the SDRAM style interface. Subsequent memory locations are read by means of one or more control signals that function independently of the SDRAM style interface.

Further, according to the invention there is provided a method of reducing control and address lines in a computer system having non-volatile memory and SDRAM, comprising providing the non-volatile memory with an interface compatible with an SDRAM interface.

Still further, according to the invention, there is provided a method of configuring a SDRAM interface in a computer system wherein the computer system has a non-volatile memory with an SDRAM interface, comprising storing interface initialization code in the first location of the first accessed memory row of the non-volatile memory, providing a control signal independent of the interface for performing a read operation from the first location in the first accessed memory row in the non-volatile memory and providing a second control signal independent of the interface for incrementing the internal address of the non-volatile memory. The first portion of boot code, used for SDRAM interface initialization is thus delivered on the data bus to the computer system for sequential execution. The code performs no branch operations until the system is ready for random access code execution. Once the SDRAM interface logic has been initialized, a jump instruction may be executed to a location in the non-volatile memory where the remaining system boot code is located. The initialization code may alternatively include instructions for copying a portion of a boot code in the non-volatile memory into a random access memory, and a final instruction for branching to the portion of the boot code in the random access memory.

Still further, according to the invention, there is provided a computer system comprising non-volatile memory and volatile memory, wherein the non-volatile memory and volatile memory have a common interface, which, preferably, is a SDRAM style interface. Preferably, the code for initializing the interface logic is stored in the first location in the first accessed memory row of the non-volatile memory. The system typically includes a first control line that is independent of the interface, for reading from the first memory location in the first accessed memory row, and a second control line that is independent of the interface for incrementing the internal address register of the non-volatile memory.

DETAILED DESCRIPTION OF THE INVENTION

Figure 1:
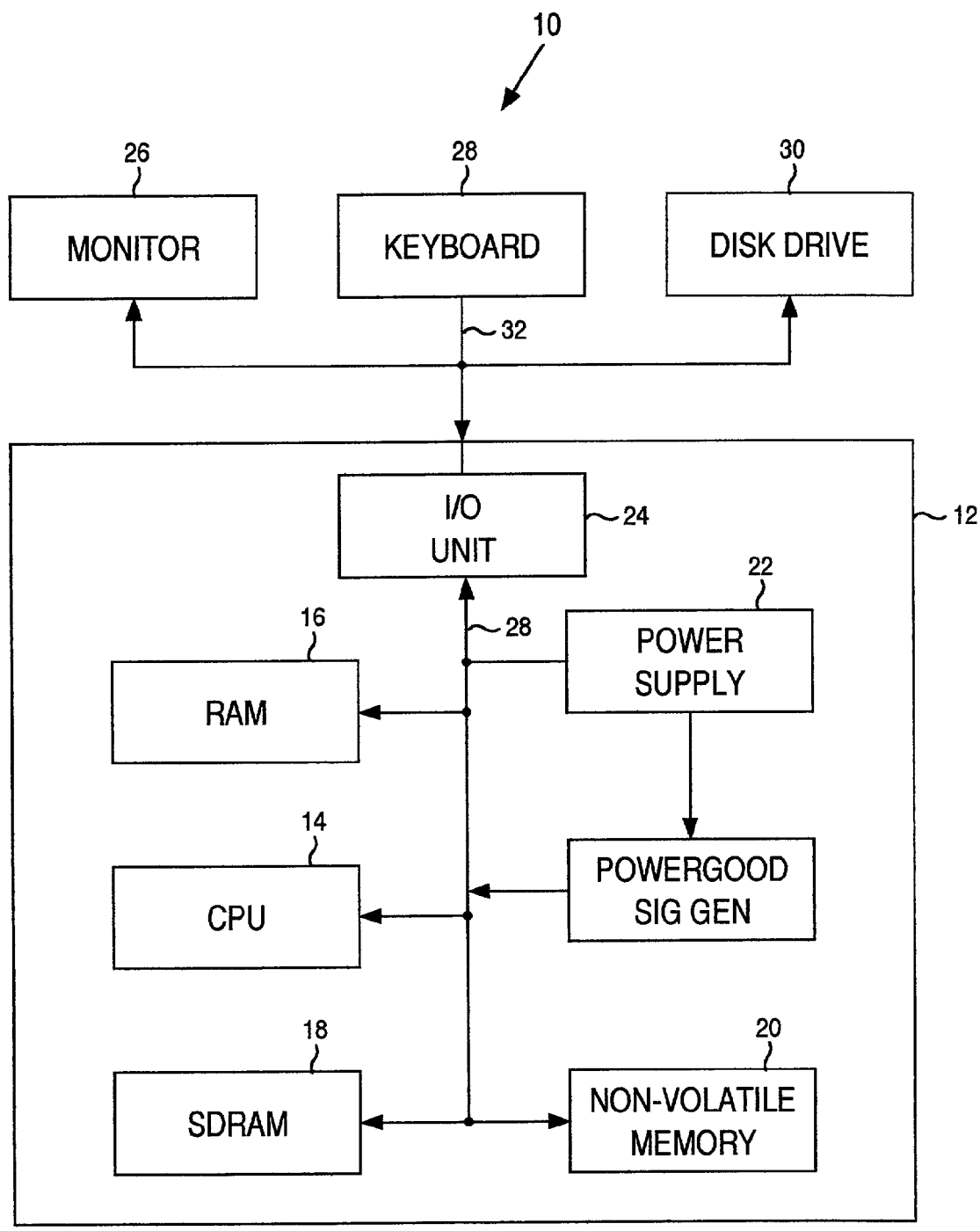
FIG. 1 is a simplified block diagram of a computer system of the invention.

A typical computer system 10 is shown in FIG. 1. The system 10 is implemented on a motherboard 12, and includes a processor or central processing unit (CPU) 14 also known as a micro-controller or micro-processor, a volatile random access memory 16, a volatile sequential access memory in the form of SDRAM 18, and non-volatile memory 20. A power supply 22 is provided on the motherboard 12 in a conventional manner, and an input/output (I/O) unit 24 provides an interconnection of the motherboard 12 to typical I/O devices such as a display monitor 26, keyboard 28, and one or more disk drives 30. These components are interconnected by signal buses, power lines, connectors, etc., as collectively indicated at 32. The non-volatile memory 20 has the same interface as the SDRAM.

The boot code for initializing the SDRAM interface logic, the internal logic of the SDRAM, and the rest of the system is stored in the non-volatile memory 20, which may be Flash memory.

Figure 2:
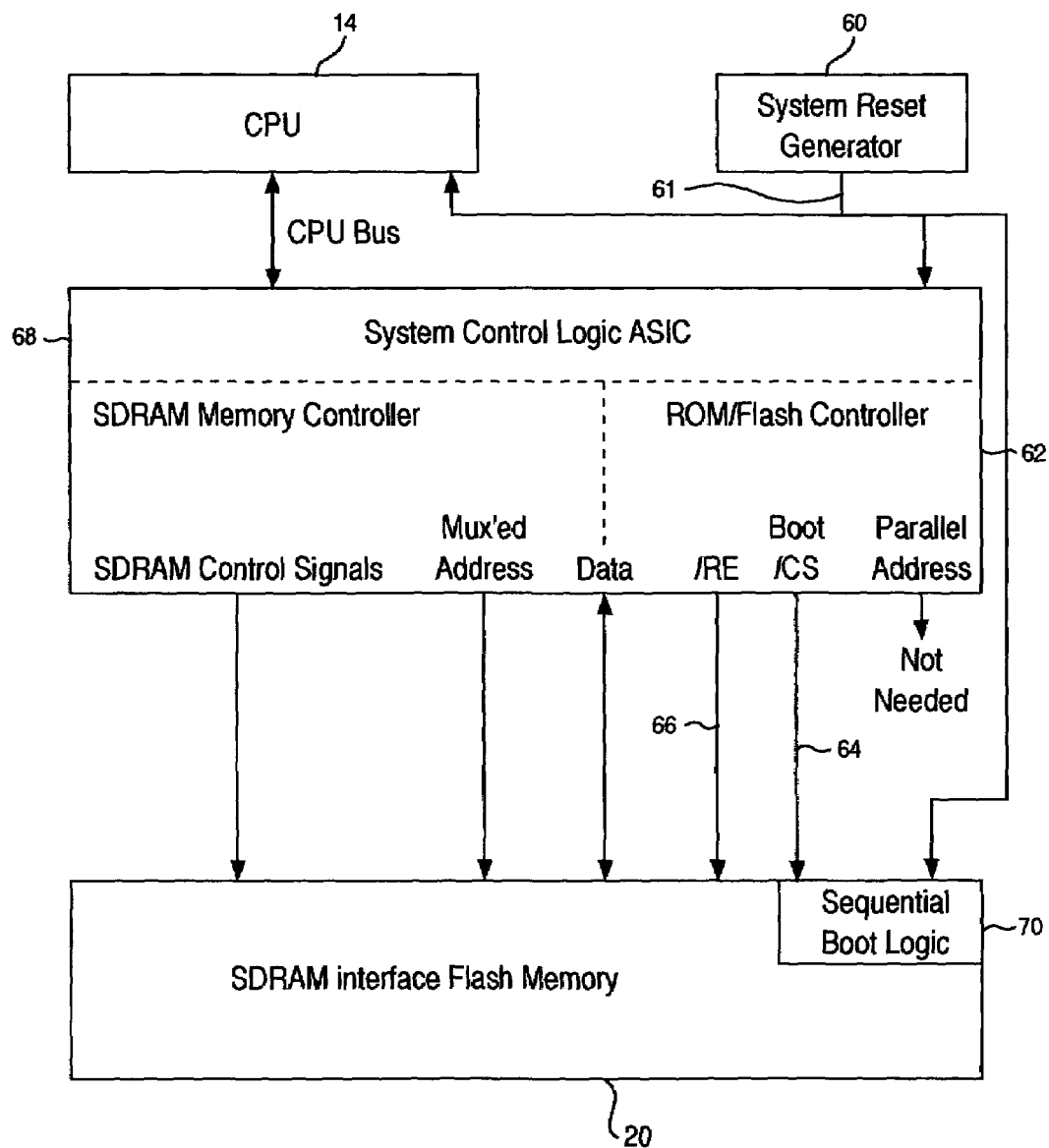
FIG. 2 is a more detailed block diagram of the system of the invention.

Referring to FIG. 2, during power-up (reset time), e.g., using the system reset generator 60 asserts the system reset signal 61, the internal state machine for sequential boot code access 70 for the system non-volatile memory 20 pre-reads the first row of the memory array and has it ready for read by the end of system reset time. A control signal such as chip select signal 64 (CS#), which functions independently of SDRAM interface initialization requirements, is used to initiate a read operation at the first location in the first accessed memory row. A second control signal, in this embodiment, read enable (RE#) signal 66 is used to indicate when the read data is to be delivered on the system data bus. The deassertion of the RE# signal 66 by the ROM/Flash controller 62 is used to increment the internal address to select the next location in the first memory row.

The system processor 14 starts the system initialization process by issuing reads to the non-volatile memory address range. A boot program address range decoder in the system control logic ASIC 68 responds by triggering the Flash controller 62 to output the CS# signal 64. Thus, the first address in non-volatile memory 20 is accessed by means of an SDRAM interface independent control signal (CS# signal 64), whereafter the sequential access logic 70 incorporated into the logic subsystem of the non-volatile memory 20 with its SDRAM interface, receives the RE# control signal 66, causing it to deliver sequential words to the data bus. These first words of boot code are constructed so as to do no branching and only perform the basic configuration of the SDRAM interface so as to initialize the SDRAM interface for normal operation. Thereafter, the remaining system initialization boot code may be execute in place (XIP), or instead, copied to random access memory 16 (FIG. 1), whereafter a transfer branch is made from the non-volatile memory 20 to the boot code copied into the random access memory 16 for standard system initialization.

Ideally, the non-volatile memory 20 is able to support reading an unlimited number of sequential rows during the initial boot operation to allow unlimited coding for the boot process. However, it may be acceptable to only be able to read out a single row of words.

With this scheme there is no dependence on lower significant addresses from the processor. The memory 20 will read the same sequence of initial words independent of whether the processor uses a lower or high memory starting address. The processor simply fetches the code, and the non-volatile memory 20, under control of the sequential access logic 70, delivers purely sequential code, at least until the system is operational for normal code execution. Other than that the address range decoder in the system control logic ASIC 68 decodes the initial address range to trigger the Flash controller 62 to output the CS# signal 64, the processor-supplied address is ignored by the memory since no non-sequential access is attempted by the code being executed. The processor simply needs an initial sequence of code to execute and assumes that the code delivered by the memory in response to the CS# signal 64 and RE# signal 66 is coming from the requested initialization code address location specified by the processor. The absolute location of the code in the memory array is unimportant as long as the initialization code is delivered by the non-volatile memory 20 following a system reset.

It will be appreciated that a non-volatile memory must be able to recognize a system reset event in order to know when to access the initial code sequence. The recognition of system reset could be through a separate (RESET#) signal pin or through the assertion of an unusual combination of standard SDRAM interface pins, such as the simultaneous assertion of CS#, RAS#, CAS#, and WE#.

Furthermore, the non-volatile memory 20 must be able to recognize that it is being selected to deliver code. The chip selection could be through the standard SDRAM interface pin CS# or through a separate pin dedicated to indicate the selection for sequential boot code access, (BOOTCS#).

The non-volatile memory 20 must also be able to recognize when to deliver each successive data word. The output enable and address advancing function (RE# signal in this embodiment) could be a separate pin or be served by the standard SDRAM interface data strobe (DQS) signal pin during the sequential initialization process. The pin could revert to its normal function following the first assertion of RAS after a reset.

In another embodiment, a single signal pin such as a Boot# pin could serve all these functions. The Boot# signal could be asserted for several clock cycles or some otherwise relatively long period to indicate a system reset. Once the memory completes its internal reset, the same Boot# signal could be asserted to indicate that data should be driven onto the bus. Deasserting the Boot# signal would advance the internal address to select the next sequential data word. In any event, in order to implement the system initialization control signals, a preferred embodiment would not require any additional control signals beyond those currently defined by the standard SDRAM interface and as few as one additional control line.

By adopting the use of interface independent control lines and the existing sequential access logic used in SDRAM interfaces, to access the SDRAM interface initialization code, the problem is avoided of how to initialize the SDRAM interface logic via an SDRAM interface that has not yet been initialized. The process can also be asynchronous since the timing of all the initial instruction read accesses is directly controlled by the signal used to perform the read enable function.

It will be appreciated that the invention is not limited to the specific embodiment described and that various configurations could be implemented making use of a non-volatile memory having an interface that is common with a volatile memory.

What is claimed is:

1. A computer system comprising:
   a central processor;
   a system reset generator coupled to said central processor for asserting a reset signal;
   a system controller coupled to said central processor and said system reset generator, wherein said system controller comprises an SDRAM memory controller and a non-volatile memory controller;
   addressable non-volatile memory coupled to said system controller, said system reset generator and said central processor, wherein said non-volatile memory comprises a sequential boot logic section;
   a data bus coupled between said system controller and said non-volatile memory;
   an SDRAM control signal line coupled between said SDRAM memory controller and said non-volatile memory, said SDRAM control signal line for carrying SDRAM control signals;
   a first control signal line coupled directly between said non-volatile memory controller and said non-volatile memory for transmitting a chip select signal from said non-volatile memory controller in response to said reset signal, wherein said chip select signal is for initiating a first read operation of a first data word at a first address in a first accessed row of said non-volatile memory; and
   a second control signal line coupled directly between said non-volatile memory controller and said sequential boot logic section for transmitting a read enable signal to said non-volatile memory, wherein said read enable signal is for causing said non-volatile memory to deliver data words sequentially to said data bus beginning with said first data word, and wherein said sequentially delivered data words are for initializing an SDRAM interface of said non-volatile memory for normal operation with said computer system.

2. The system of claim 1 wherein said first control signal line and said second control line comprise a single control signal line.

3. The system of claim 1 wherein said first read operation is performed at a first address in a first accessed row of said sequential boot logic section of said non-volatile memory.

4. The system of claim 1 wherein said chip select signal is coupled to a pin on said non-volatile memory that does not receive SDRAM control signals.

5. The system of claim 1 wherein said chip select signal is coupled to a pin on said non-volatile memory that also receives SDRAM control signals.

6. The system of claim 1 wherein said sequential boot logic section comprises a storage area for data for configuring said SDRAM interface.

7. The system of claim 1 wherein said read enable signal and said chip select signal comprise an identical signal.

8. The system of claim 1 wherein said chip select signal issued in response to said reset signal always initiates a read operation to the same memory address regardless of any memory read address requested for reading by said central processor.

9. The system of claim 1 wherein parallel address lines are not connected between said non-volatile memory controller and said non-volatile memory.

10. The system of claim 1 wherein said non-volatile memory is a flash memory with an SDRAM interface.

11. A method of configuring a non-volatile memory in a computer system, said method comprising:
    issuing a system reset signal from a system reset generator upon booting of said computer system;
    receiving an initial memory read address in a system controller, said initial memory read address supplied by said central processor;
    issuing a chip select signal from a non-volatile memory controller of said system controller, wherein said chip select signal is issued to a non-volatile memory for initiating a first read operation of a first data word at a first address in a first accessed row of said non-volatile memory;
    reading said first data word;
    issuing a read enable signal from said non-volatile memory controller, wherein said read enable signal is issued to said non-volatile memory for causing said non-volatile memory to deliver data words sequentially to a data bus beginning with said first data word;
    outputting sequential data words from said non-volatile memory beginning with said first data word, said sequential data words being output from a sequential boot logic section of said non-volatile memory; and
    initializing an SDRAM interface of said non-volatile memory for normal operation with said computer system, wherein said initializing is performed in response to data from said sequentially output data words.

12. The method of claim 11 wherein said sequential boot logic section stores data for initializing said SDRAM interface.

13. The method of claim 11 wherein reading said first data word comprises reading said first data word from an identical memory address each time said system is booted, regardless of said initial memory address requested for reading by said central processor.

14. The method of claim 11 further comprising receiving said chip select signal at said non-volatile memory on a signal line coupled directly between said non-volatile memory controller and said non-volatile memory.

15. The method of claim 11 further comprising receiving said read enable signal at said non-volatile memory on a signal line coupled directly between said non-volatile memory controller and said non-volatile memory.

16. The method of claim 11 further comprising receiving said read enable signal and said chip select at said non-volatile memory on a single signal line coupled directly between said non-volatile memory controller and said non-volatile memory.

17. The method of claim 11 further comprising receiving said chip select signal at said non-volatile memory on a pin of said non-volatile memory that does not receive SDRAM control signals.

18. The method of claim 11 further comprising receiving said chip select signal at said non-volatile memory on a pin of said non-volatile memory that also receives SDRAM control signals.

19. The method of claim 11 wherein said chip select signal and said read enable signal comprise an identical signal.

* * * * *